United States Patent
St-Aubin et al.

(10) Patent No.: US 11,250,014 B2
(45) Date of Patent: Feb. 15, 2022

(54) GENERATING PREVIEWS OF POSSIBLE JOIN RELATIONSHIPS

(71) Applicant: International Business Machines Corporation, Armonk, NY (US)

(72) Inventors: Zoe A. St-Aubin, Ottawa (CA); Robert Kenneth Hatfield, Stittsville (CA); Ilse M. Breedvelt-Schouten, Manotick (CA); Yasmin Taha, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/543,579

(22) Filed: Aug. 18, 2019

(65) Prior Publication Data

US 2021/0049162 A1 Feb. 18, 2021

(51) Int. Cl.
*G06F 16/248* (2019.01)
*G06F 9/451* (2018.01)
*G06F 3/0481* (2013.01)
*G06F 16/2455* (2019.01)
*G06F 16/22* (2019.01)

(52) U.S. Cl.
CPC .......... *G06F 16/248* (2019.01); *G06F 3/0481* (2013.01); *G06F 9/451* (2018.02); *G06F 16/2282* (2019.01); *G06F 16/2456* (2019.01)

(58) Field of Classification Search
CPC .................................................. G06F 16/248
USPC ....................................................... 707/722
See application file for complete search history.

(56) References Cited

U.S. PATENT DOCUMENTS

| | | | |
|---|---|---|---|
| 6,353,452 B1 * | 3/2002 | Hamada | G06F 16/2423 715/825 |
| 6,356,896 B1 * | 3/2002 | Cheng | G06F 16/2423 |
| 6,553,371 B2 * | 4/2003 | Gutierrez-Rivas | G06F 16/2423 |
| 7,793,234 B1 * | 9/2010 | Ibbotson | G06F 16/2428 715/853 |
| 9,335,911 B1 | 5/2016 | Elliot et al. | |
| 9,916,350 B2 | 3/2018 | Young et al. | |
| 10,529,099 B2 * | 1/2020 | Kumar | G06T 11/00 |
| 2016/0154778 A1 | 6/2016 | Fourny et al. | |
| 2016/0224656 A1 | 8/2016 | Rais-Ghasem et al. | |
| 2017/0147643 A1 * | 5/2017 | Zaidi | G06F 16/2428 |
| 2017/0147644 A1 | 5/2017 | Lee et al. | |
| 2017/0193014 A1 | 7/2017 | Mishra et al. | |
| 2017/0262506 A1 | 9/2017 | Sharma et al. | |
| 2018/0075115 A1 | 3/2018 | Murray et al. | |

OTHER PUBLICATIONS

"Joining Tables," zoho.com, Mar. 2018, 9 pages.
"Join Panel," Trifacta, 2013, 5 pages.

* cited by examiner

*Primary Examiner* — Sheree N Brown
(74) *Attorney, Agent, or Firm* — VanLeeuwen & VanLeeuwen; Alexander G. Jochym (57) ABSTRACT

An approach is provided in which the approach receives a user selection that selects a first column in a first database table and a second column in a second database table. The approach creates multiple visualizations based on the user selection that are each based on actual data extracted from both the first database table and the second database table. In turn, the approach displays each of the multiple visualizations concurrently on a display.

17 Claims, 8 Drawing Sheets

| Preferences Table 800 |||
|---|---|---|
| User | Table Group | Join Setting |
| X | A/B | Left Outer Join |
| X | C/E | Right Outer Join |
| X | M/O | Full Outer Join |
| Y | A/B | Inner Join |
| Y | Q/E | Inner Join |
| Y | P/L | Full Outer Join |
| Y | A/S | Left Outer Join |
| Z | D/S | Right Outer Join |
| Z | L/Q | Left Outer Join |
| Z | B\N | Inner Join |

GENERATING PREVIEWS OF POSSIBLE JOIN RELATIONSHIPS

BACKGROUND

A "join" statement is an SQL (Structured Query Language) operation that establishes a connection between two or more database tables based on matching columns and creating a relationship between the tables. Four join types are popular that present data from the database table into four different visualizations (presentation views), which are an inner join, a left outer join, a right outer join, and a full join.

An inner join selects records from two tables that hold matching values. Records that do not hold matching or common values are excluded from the output. The query compares each row of the first table with rows of the second table to find rows to satisfy the join predicate. Outer joins take in all records of one table along with the matching records of the other table as output. In a left outer join, all tables of the left table, even if they do not satisfy the matching conditions, and the matching rows of the right table are displayed in the output. In a right outer join, all rows of the right table and matching rows of the left table are displayed as output. In a full join, the result set includes all rows from both tables, populating the columns with table values when possible or with nulls when there is no match in the counterpart table.

BRIEF SUMMARY

According to one embodiment of the present disclosure, an approach is provided in which the approach receives a user selection that selects a first column in a first database table and a second column in a second database table. The approach creates multiple visualizations based on the user selection that are each based on actual data extracted from both the first database table and the second database table. In turn, the approach displays each of the multiple visualizations concurrently on a display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
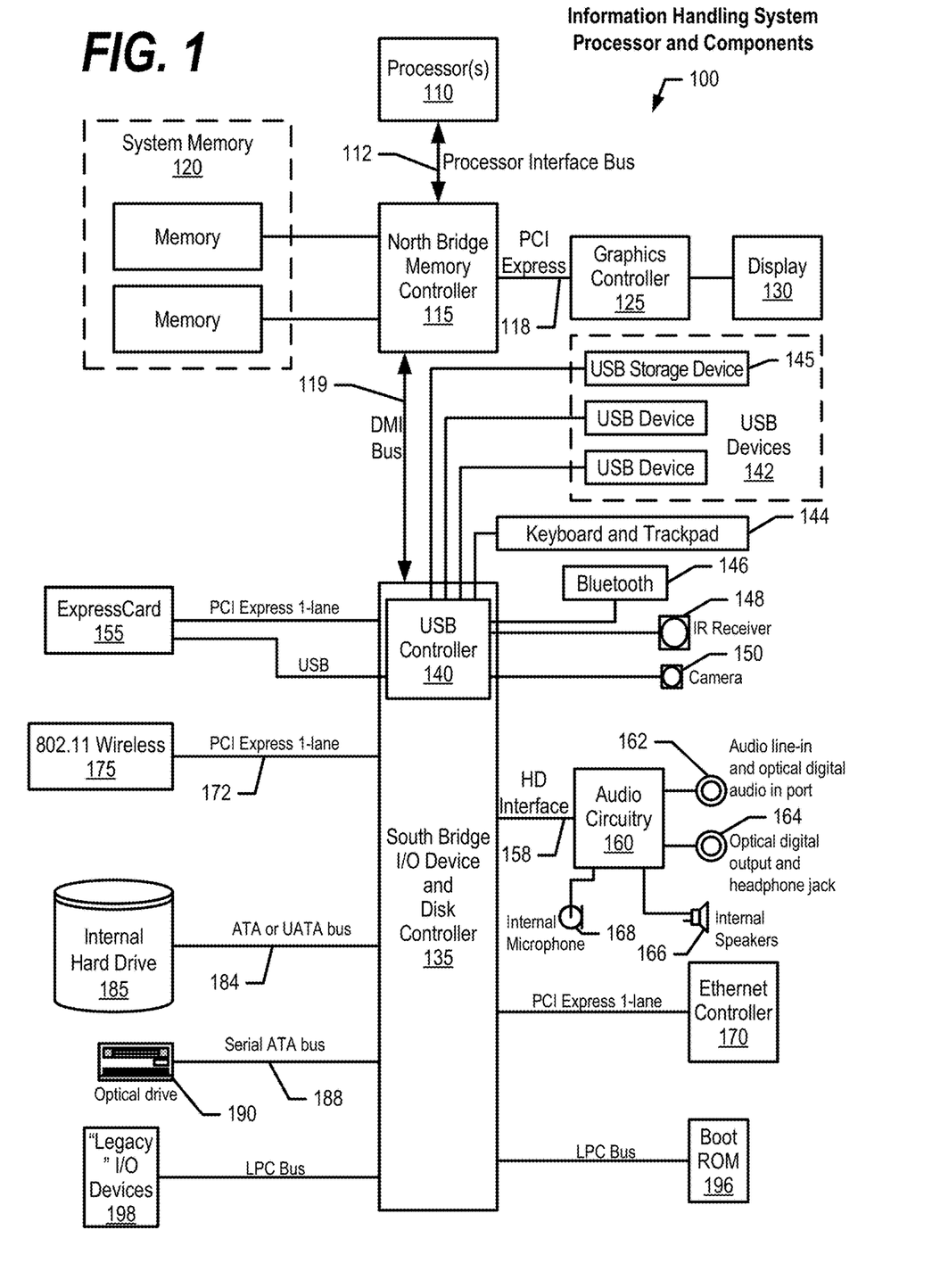
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
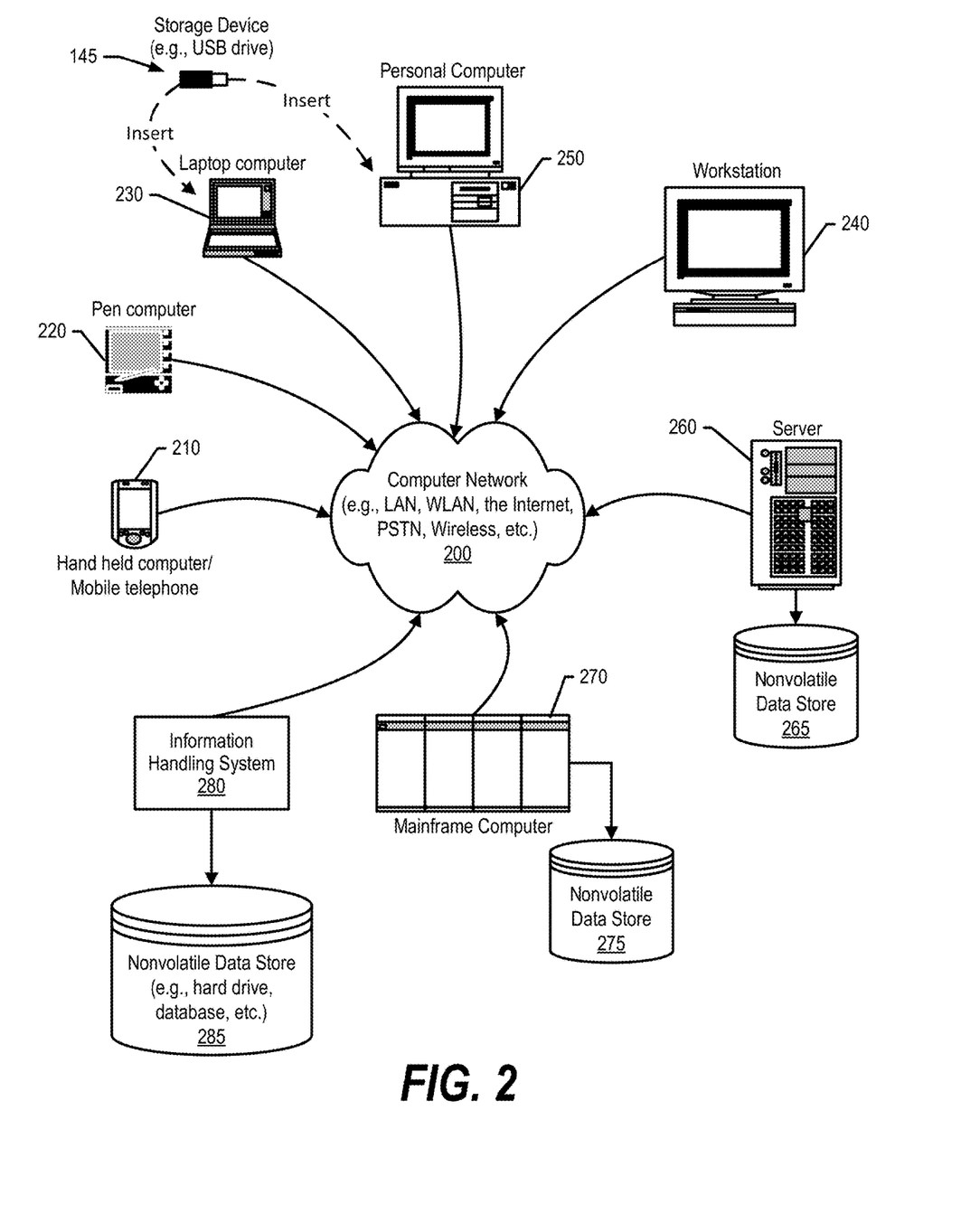
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a user uses joins during database table analysis to evaluate different visualizations of the data. A challenge found with creating joins for an average user, however, is that the user is required to define the joins between the database tables on selected columns. This is currently a difficult and cumbersome task to fulfill because the specialized join terms are technical terms that are not well understood by the average user and, as such, the average user has difficulty in defining proper join functions that produce acceptable results.

Current user interfaces require a user to define join settings in a specialized "modelling" user interface that is separate from a user dashboard or report interface. Some user interfaces attempt to explain the meaning of each of the settings using words and abstract pictures (e.g., Venn diagrams), but the user has difficulty conceptualizing the actual impact of a particular setting on the resulting visualization(s). As such, a need exists to provide average users an ability to join tables in the context of the creation of visualizations without a requirement for the user to understand join type terminology and definitions.

FIGS. 3 through 8 depict an approach that can be executed on an information handling system that provides join visualizations using actual database table data and allows the user to select a most suitable visualization for the user's intended purpose. The approach uses gestures of combining two columns from two different tables to create a new visualization as a trigger to join the two tables and, once a possible join has been triggered, the approach generates multiple visualizations with accompanying text that represent the options for different join types based on the selected columns.

The approach discussed herein is "average user" friendly and does not require the user to actively open a dialog to correctly join the two tables and set the right join settings. The approach also does not require the user to imagine possible outcomes because the approach provides preview visualizations to the user with actual data from the database tables.

In one embodiment, after the user selects an initial visualization for the join type, the approach provides an option for the cardinality (1-to-many, many-to-1 or many-to-many). In addition, the approach combines the join type and cardinality for the suggested visualizations to, for example, provide twelve visualizations.

In another embodiment, the approach stores the user's join preferences for specific database table groups (two database tables) so that the next time the user selects columns from the same two database tables, the approach uses the previously selected join option as a first option (e.g., inner join) while still rendering the other join options if configured.

Figure 3:
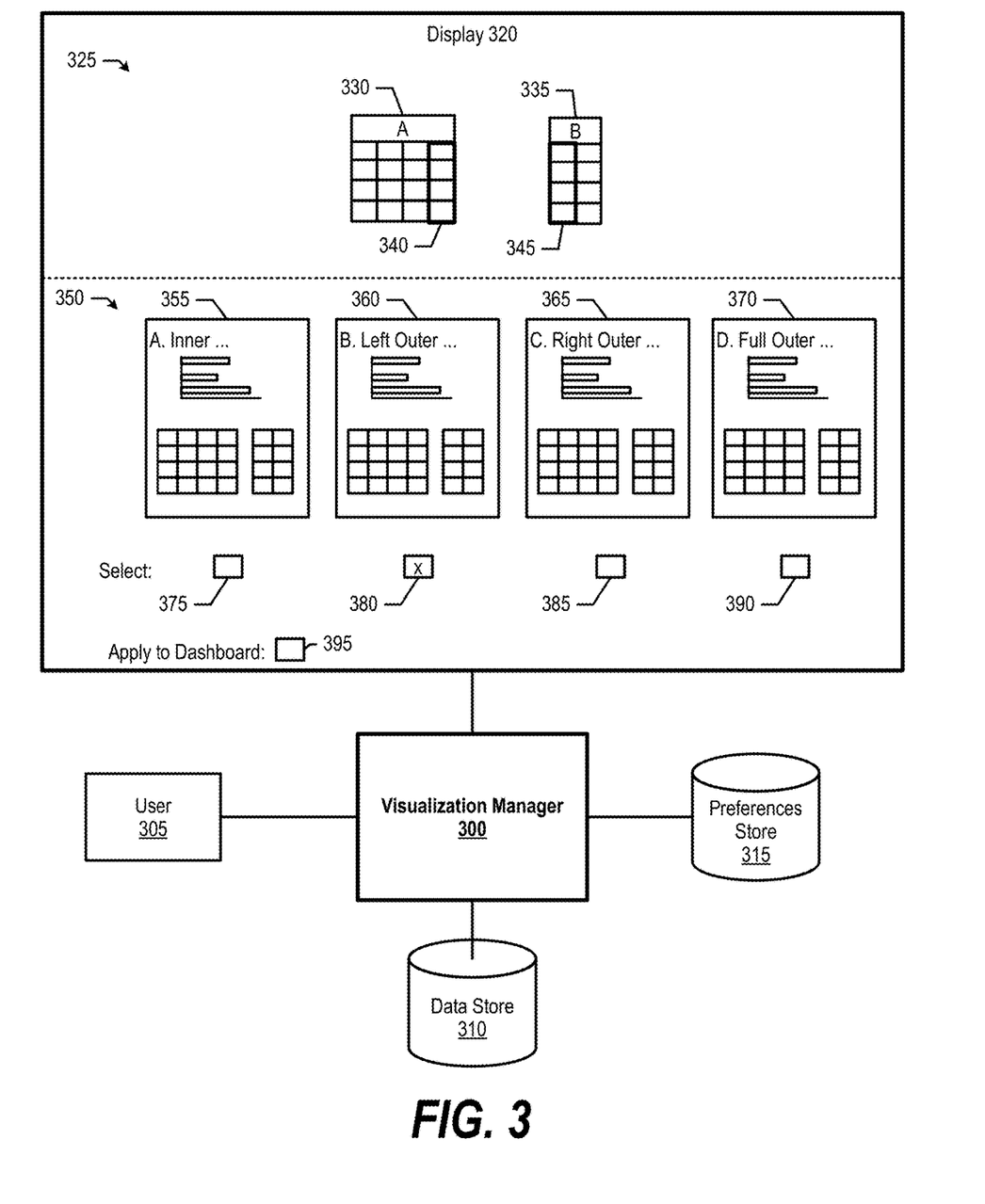
FIG. 3 is an exemplary diagram depicting a user selecting columns in a group of database tables (database table group) and a visualization manager displaying multiple visualization previews (visualizations) based on actual data from the database table group.

FIG. 3 is an exemplary diagram depicting user 305 selecting columns in a group of database tables 330 and 335 (database table group) and visualization manager 300 displaying multiple visualization previews 355, 360, 365, and 370 (visualizations) based on actual data from the database table group.

Visualization manager 300 receives a database request from user 305 to display two database tables A 330 and B 335. In turn, visualization manager 300 retrieves the requested database tables from data store 310 and displays them on display 320 in area 325 (in one embodiment). Next, to initiate a join operation, user 305 selects a column in each of tables A 330 and B 335, which are columns 340 and 345 respectively (see FIG. 4 and corresponding text for further details). Visualization manager 300 then performs a series of steps to create an SQL query that requests four different joins, which are an inner join, a left outer join, a right outer join, and a full join (see FIGS. 5-7 and corresponding text for further details).

Visualization manager 300 invokes the query and creates four different visualizations from the query results of the four different joins as visualizations 355, 360, 365, and 370 (shown in area 350). Each of the four visualizations is based on actual data from database tables A 330 and B 335. User 305 may then select box 375, 380, 385, or 390 to select one of the joins.

In one embodiment, visualization manager 300 stores user 305's selection as a preference in preferences store 315 so that visualization manager 300 performs the same join type (e.g., inner join) when user 305 subsequently requests the same database tables A 330 and B 335 as the database table group (see FIG. 8 and corresponding text for further details). Visualization manager 300 also allows user 305 to apply the join selection to user 305's entire dashboard by selecting box 395.

Figure 4:
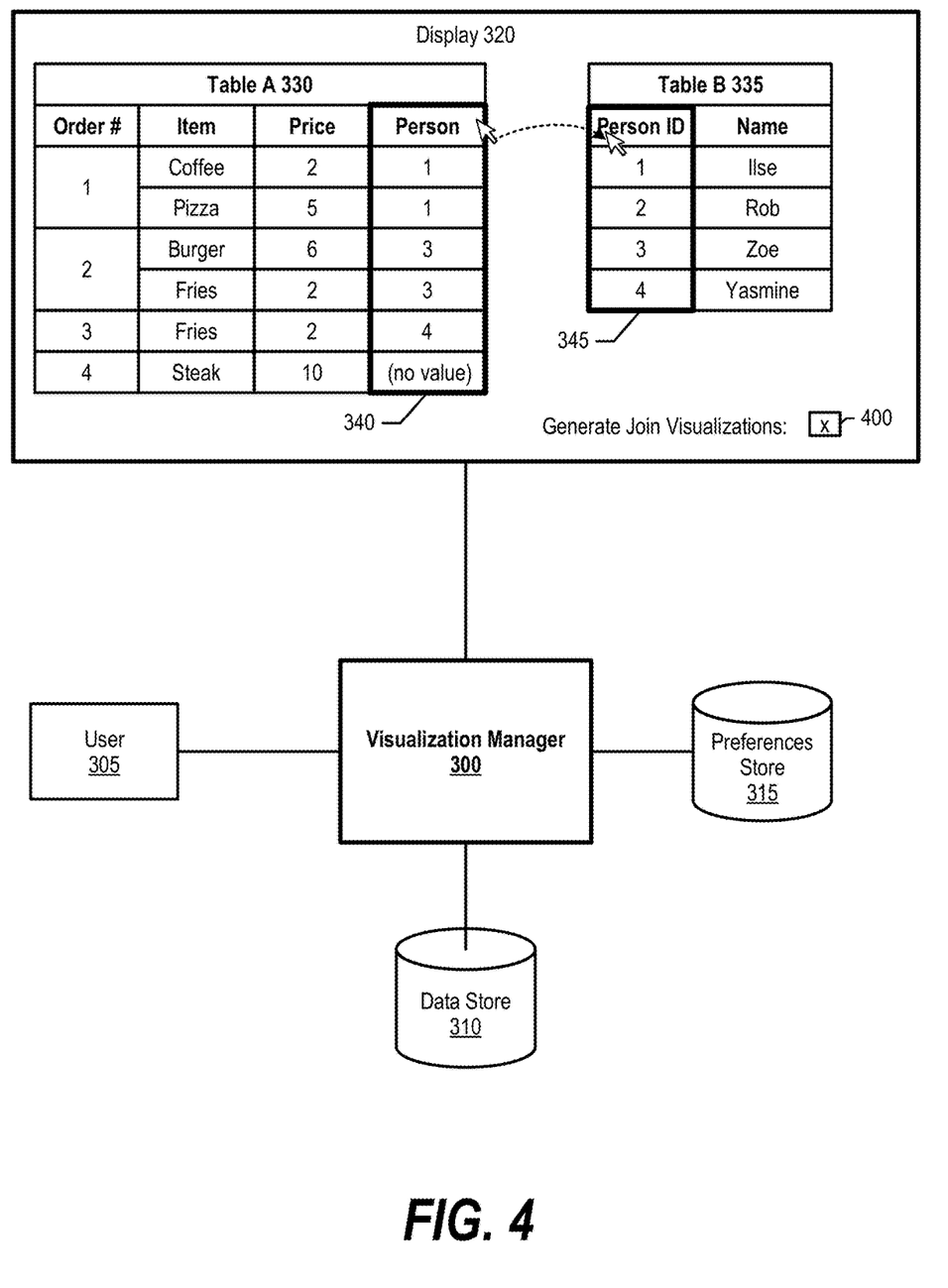
FIG. 4 is an exemplary diagram depicting a user selecting two columns in a database table group that visualization manager uses as a basis to generate multiple visualizations.

FIG. 4 is an exemplary diagram depicting a user selecting two columns in a database table group that visualization manager uses as a basis to generate multiple visualizations.

Visualization manager 300 displays database table A 330 and B 335 on display 320 for user 305 to view. User 305 wishes to have a join generated from the tables and is not sure exactly what type of join would be most beneficial to user 305's intended purpose. User 305 selects column 340 in database table 340 and selects column 345 in database table B 335, and then selects box 400 to instruct visualization manager 300 to generate multiple join visualizations.

Visualization manager 300 analyzes the selected columns and recognizes that "Person" and Person ID" are recognized as the same types of columns based on their corresponding metadata (both include names of customers and the titles are similar). Visualization manager 300 creates four different queries for the four different visualizations (inner join, left outer join, right outer join, full join) and generates four different visualizations from the query results (see FIGS. 5, 6, and corresponding text for further details).

Figure 5:
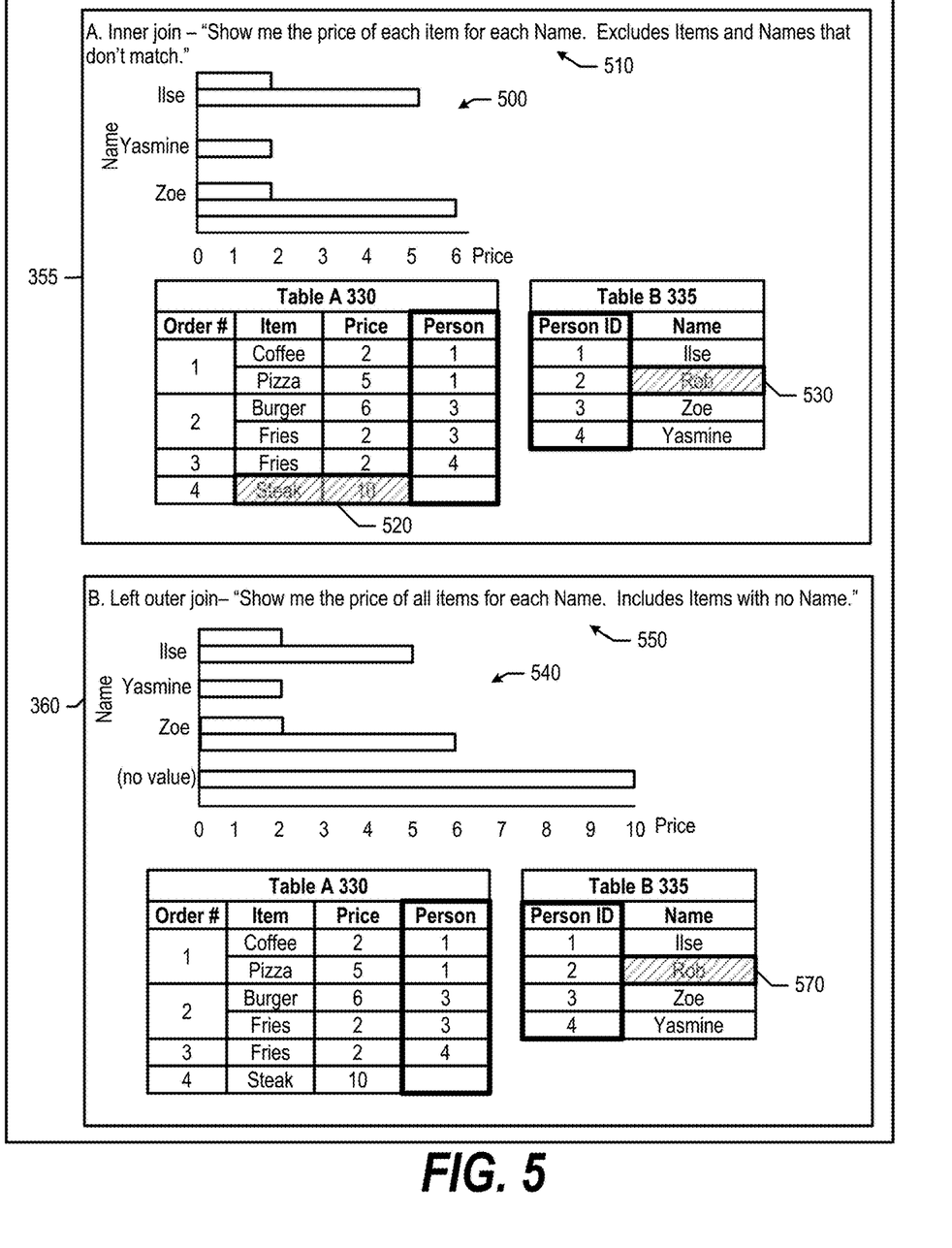
FIG. 5 is an exemplary diagram showing an inner join visualization preview and a left outer join visualization preview that are both based on actual data from a database table group.
Figure 6:
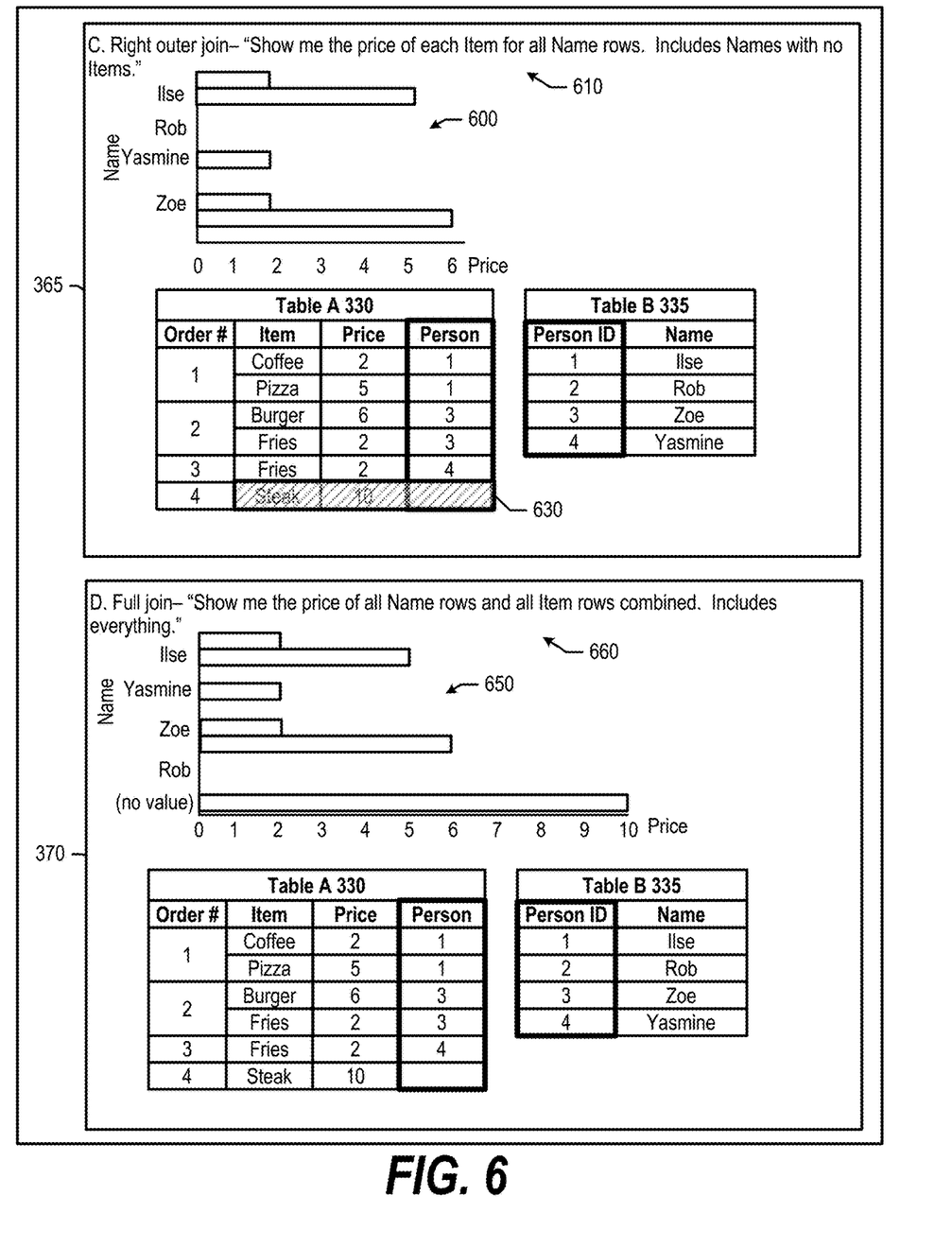
FIG. 6 is an exemplary diagram showing a right outer join visualization preview and a full join visualization preview that are both based on actual data from a database table group.

FIG. 5 is an exemplary diagram showing an inner join visualization preview and a left outer join visualization preview that are both based on actual data from a database table group. FIG. 5 shows two of the four visualizations generated by visualization manager 300, which are inner join visualization 355 and left outer join visualization 360. FIG. 6 shows the other two visualizations, which are right outer join visualization 365 and full join visualization 370.

Referring back to FIG. 5, inner join visualization 355 shows join results 500 as an aggregation and a natural language description 510 of the join results to assist user 305 in understanding which one of the visualizations is best for user 305's intended purpose. In one embodiment, visualization manager 300 shades out table entry data that is not utilized in the results based on the join type to better inform the user of how the join type functions. In another embodiment, visualization manager 300 highlights the data that is included in the join results. Inner join visualization 355 shows shade out 520 and shade out 530. Shade out 520 indicates that "Order 4" details are not included in results 500 because "Order 4" does not have a "person" entry that matches a "person ID" entry in database table B 335. Shade out 530 indicates that "Rob" is excluded form results 500 because his corresponding "Person ID" of "2" does not match any entries in the "Person" column in database table A 330.

Left outer join visualization 360 shows join results 540 as an aggregation and a natural language description 550 of the join results to assist user 305 in selecting one of the visualizations for user 305's intended purpose. Left outer visualization 360 shows shade out 570 to indicate that "Rob" is excluded from results 510 because "Person ID 2" from database table B 335 does not match any entry in the "Person" column in database table A 330.

FIG. 6 is an exemplary diagram showing a right outer join visualization preview and a full join visualization preview that are both based on actual data from a database table group. FIG. 6 shows the other two visualizations, which are right outer join visualization 365 and full join visualization 370.

Right outer join visualization 365 shows join results 600 as an aggregation and a natural language description 610 of the join results to assist user 305 in selecting one of the visualizations for user 305's intended purpose. Right outer join visualization 365 shows shade out 630 to indicate that "Steak" and "10" are excluded form results 600 because the "blank" Person entry does not match with any field in from the Person ID column in database table B 335.

Full join visualization 370 shows join results 650 as an aggregation and a natural language description 660 of the join results to assist user 305 in selecting one of the visualizations for user 305's intended purpose.

Figure 7:
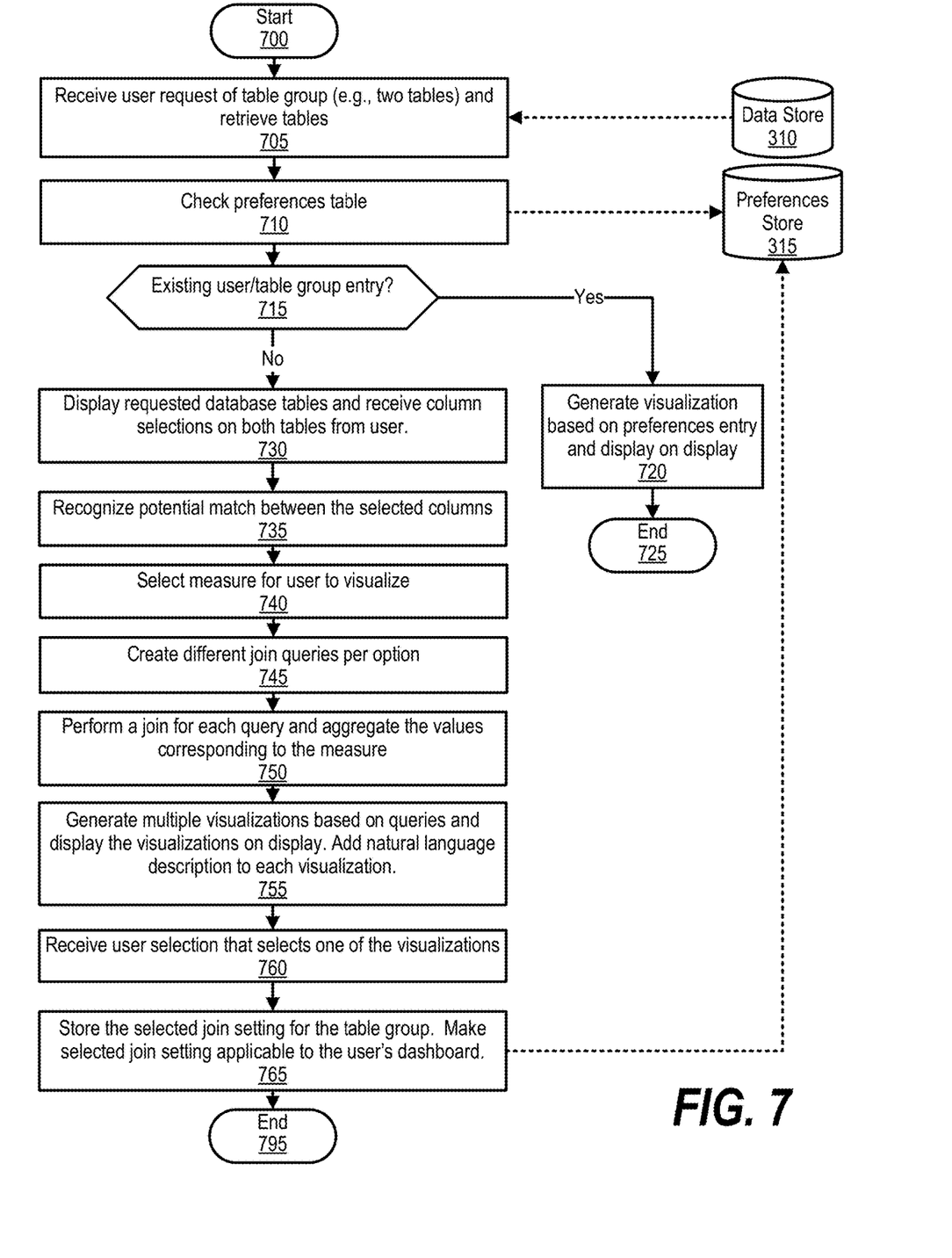
FIG. 7 is an exemplary flowchart showing steps taken to generate multiple join visualizations based on actual data from a database table group.

FIG. 7 is an exemplary flowchart showing steps taken to generate multiple join visualizations based on actual data from a database table group. FIG. 7 processing commences at 700 whereupon, at step 705, the process receives a user request for two database tables and the process retrieves the requested database tables from data store 310.

At step 710, the process checks a preferences table in preferences store 315 to determine if user 305 has a join type preference for the requested database table group. For example, user 305 may have previously joined the requested database tables using an inner join and user 305 prefers inner joins for the database table group for subsequent database table joins (see FIG. 8 and corresponding text for further details).

The process determines as to whether the preferences table includes an entry for the selected database table group (decision 715). If there is an existing preference entry corresponding to the database table group and user 305, then decision 715 branches to the 'yes' branch whereupon, at step 720, the process generates a visualization (e.g., inner join) based on the preferences entry and displays the visualization on display 320. In one embodiment, the process presents all four visualization previews and enlarges the visualization corresponding to user 305's preference. In this embodiment, user 305 may select a different visualization instead of the preferred visualization. FIG. 7 processing thereafter ends at 725.

On the other hand, if the preferences table does not include a preference entry for user 305 for the selected database table group, then decision 715 branches to the 'no' branch. At step 730, the process displays the requested tables on display 320 and receives column selections on both tables from user 305 (see FIG. 4 and corresponding text for further details). At step 735, the process recognizes a potential match between the selected columns using techniques such as by comparing metadata of the two selected columns.

At step 740, the process selects a measure to visualize (e.g., a short name of the column name that reflects the measure value column). In one embodiment, the process identifies columns that reflect measures (e.g. using existing analytics technologies for detecting data types). In this embodiment, the process selects the first measure it comes across in the first table. In another embodiment, user 305 can select the available measures from both tables in the flow (e.g. by selecting from a list of measures found in the two tables).

At step 745, the process creates different join queries per option (inner, outer left, outer right, full). At step 750, the process performs a join for each join query and aggregates the values for each join that correspond to the measure. As discussed above, a join is when two columns are representing the same information, using the same data type. For example, a join can happen when "customer name" and "custname" are recognized as the same types of columns (both contain names of customers and the titles are similar). In one embodiment, the process uses aggregate SQL functions to aggregate the values of the selected measure. In this embodiment, the type of aggregation is dependent on the type of join created.

At step 755, the process generates multiple visualizations based on the query results and displays the visualizations on display 320. In addition, the process generates natural language descriptions for each of the visualizations to inform user 305 of what the visualizations entail in a natural language manner. In one embodiment, the process uses a template for each of the descriptions that are filled in based on the data. For example, an inner join template may be "Show me the <measure column name> of each <column name from table A> for each <column name from table B>. Excludes <column from table A> (using natural language technologies, make it plural> and <column from table B> (using natural language technology to make it plural) that do not match."

At step 760, the process receives a user selection from user 305 that selects one of the visualizations (see FIG. 3 and corresponding text for further details). At step 765, the process stores the selected join setting of the user for the database table group in preferences store 315. In one embodiment, the process allows user 305 to apply the selected join setting to user 305's dashboard as discussed above. FIG. 7 processing thereafter ends at 795.

Figure 8:
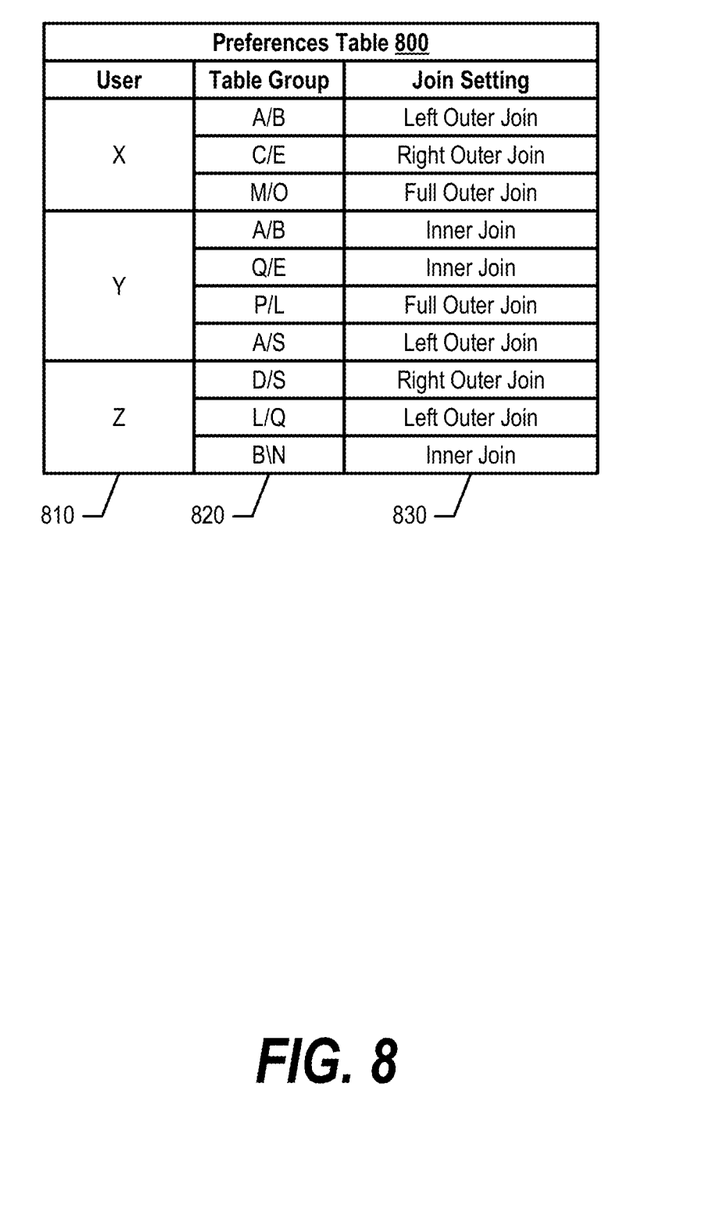
FIG. 8 is an exemplary table depicting a set of join preferences for various database table groups.

FIG. 8 is an exemplary table depicting a set of join preferences for various database table groups. Preferences table 800 includes entries for various users and various database table groups. Column 810 shows that preferences entries are stored for three different users X, Y, and Z. Column 820 includes database table group identifiers corresponding to the database table groups that the three different users have utilized. And, column 820 shows the join setting preferences of the database table groups for the various users. For example, the first entry shows that when user X selects database tables A and B, that user X's join preference is a left outer join.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    displaying a first database table and a second database table on a display; receiving a user selection from a user that selects a first column in the first database table and a second column in the second database table;
    extracting a set of data from the first database table and the second database table based on the user selection;
    creating a plurality of visualizations based on the user selection, wherein each of the plurality of visualizations is based on the set of data extracted from both the first database table and the second database table; displaying each of the plurality of visualizations concurrently on a display; receiving a selection of one of the plurality of visualizations from the user; selecting a join type that corresponds to the selected visualization; and storing the selected join type, a user identifier, and a database table group identifier as a preference entry in a preferences table.

2. The method of claim 1 further comprising:
using metadata associated with the selected first column and the selected second column to determine that a potential match exists between a first set of data in the first column and a second set of data in the second column; in response to determining that the potential match exists, identifying one of a plurality of measures for each of the plurality of visualizations; and generating a plurality of different join queries based on the identified plurality of measures that aggregate the set of data based on the identified plurality of measures.

3. The method of claim 1 further comprising:
receiving a different user selection that selects the first database table and the second database table; and automatically generating a subsequent visualization based on the selected join type stored in the preference entry.

4. The method of claim 1 further comprising:
receiving a selection from the user to apply the selected join type to a dashboard of the user; and applying the selected join type to each database table group included in the dashboard.

5. The method of claim 1 further comprising:
adding a natural language description to each of the plurality of visualizations based on a measure corresponding to the selected first column.

6. The method of claim 1 further comprising:
concurrently displaying the first database table, the second database table, and each of the plurality of visualizations on the display.

7. An information handling system comprising:
one or more processors; a memory coupled to at least one of the processors; a set of computer program instructions stored in the memory and executed by at least one of the processors in order to perform actions of:
displaying a first database table and a second database table on a display; receiving a user selection from a user that selects a first column in the first database table and a second column in the second database table; extracting a set of data from the first database table and the second database table based on the user selection; creating a plurality of visualizations based on the user selection, wherein each of the plurality of visualizations is based on the set of data extracted from both the first database table and the second database table; displaying each of the plurality of visualizations concurrently on a display; receiving a selection of one of the plurality of visualizations from the user; selecting a join type that corresponds to the selected visualization; and storing the selected join type, a user identifier, and a database table group identifier as a preference entry in a preferences table.

8. The information handling system of claim 7 wherein the processors perform additional actions comprising:
using metadata associated with the selected first column and the selected second column to determine that a potential match exists between a first set of data in the first column and a second set of data in the second column; in response to determining that the potential match exists, identifying one of a plurality of measures for each of the plurality of visualizations; and generating a plurality of different join queries based on the identified plurality of measures that aggregate the set of data based on the identified plurality of measures.

9. The information handling system of claim 7 wherein the processors perform additional actions comprising:
receiving a different user selection that selects the first database table and the second database table; and automatically generating a subsequent visualization based on the selected join type stored in the preference entry.

10. The information handling system of claim 7 wherein the processors perform additional actions comprising:
receiving a selection from the user to apply the selected join type to a dashboard of the user; and applying the selected join type to each database table group included in the dashboard.

11. The information handling system of claim 7 wherein the processors perform additional actions comprising:
adding a natural language description to each of the plurality of visualizations based on a measure corresponding to the selected first column.

12. The information handling system of claim 7 wherein the processors perform additional actions comprising:
concurrently displaying the first database table, the second database table, and each of the plurality of visualizations on the display.

13. A computer program product stored in a computer readable storage medium, comprising computer program code that, when executed by an information handling system, causes the information handling system to perform actions comprising:
displaying a first database table and a second database table on a display; receiving a user selection from a user that selects a first column in the first database table and a second column in the second database table; extracting a set of data from the first database table and the second database table based on the user selection; creating a plurality of visualizations based on the user selection, wherein each of the plurality of visualizations is based on the set of data extracted from both the first database table and the second database table; displaying each of the plurality of visualizations concurrently on a display; receiving a selection of one of the plurality of visualizations from the user; selecting a join type that corresponds to the selected visualization; and storing the selected join type, a user identifier, and a database table group identifier as a preference entry in a preferences table.

14. The computer program product of claim 13 wherein the information handling system performs further actions comprising:
using metadata associated with the selected first column and the selected second column to determine that a potential match exists between a first set of data in the first column and a second set of data in the second column; in response to determining that the potential match exists, identifying one of a plurality of measures for each of the plurality of visualizations; and generating a plurality of different join queries based on the identified plurality of measures that aggregate the set of data based on the identified plurality of measures.

15. The computer program product of claim 13 wherein the information handling system performs further actions comprising:

receiving a different user selection that selects the first database table and the second database table; and automatically generating a subsequent visualization based on the selected join type stored in the preference entry.

16. The computer program product of claim 13 wherein the information handling system performs further actions comprising: receiving a selection from the user to apply the selected join type to a dashboard of the user; and applying the selected join type to each database table group included in the dashboard.

17. The computer program product of claim 13 wherein the information handling system performs further actions comprising: adding a natural language description to each of the plurality of visualizations based on a measure corresponding to the selected first column.

* * * * *